United States Patent
Sassner et al.

(10) Patent No.: US 7,963,423 B2
(45) Date of Patent: Jun. 21, 2011

(54) FUEL DISPENSING UNIT WITH GAS SENSOR

(75) Inventors: Linda Sassner, Limhamn (SE); Bengt Larsson, Skivarp (SE)

(73) Assignee: Dresser, Inc., Addison, TX (US)

( * ) Notice: Subject to any disclaimer, the term of this patent is extended or adjusted under 35 U.S.C. 154(b) by 867 days.

(21) Appl. No.: 11/477,251

(22) Filed: Jun. 29, 2006

(65) Prior Publication Data

US 2007/0108226 A1 May 17, 2007

(30) Foreign Application Priority Data

Jul. 8, 2005 (EP) .................................... 05106269

(51) Int. Cl.
*B67D 7/08* (2010.01)
(52) U.S. Cl. ................ 222/72; 222/14; 222/59; 222/71; 96/156
(58) Field of Classification Search .................... 222/14, 222/52, 59, 71, 72; 96/155, 156
See application file for complete search history.

(56) References Cited

U.S. PATENT DOCUMENTS

| | | | |
|---|---|---|---|
| 2,831,350 A | | 4/1958 | Banks et al. |
| 5,363,988 A | * | 11/1994 | Saxton et al. ................... 222/14 |
| 5,971,042 A | * | 10/1999 | Hartsell, Jr. ................... 141/198 |
| 6,103,532 A | * | 8/2000 | Koch et al. ....................... 436/55 |
| 6,179,163 B1 | | 1/2001 | Bohr et al. |
| 6,227,227 B1 | * | 5/2001 | Poleshuk et al. ................. 137/98 |
| 6,290,760 B1 | | 9/2001 | Taivalkoski et al. |

FOREIGN PATENT DOCUMENTS

| | | |
|---|---|---|
| EP | 0 473 818 A | 3/1992 |
| EP | 0 532 202 A | 3/1993 |

OTHER PUBLICATIONS

Extended European Search Report for European Patent Application No. 05106269.3 mailed Jan. 23, 2006 (6 pages).

* cited by examiner

*Primary Examiner* — J. Casimer Jacyna
(74) *Attorney, Agent, or Firm* — Fish & Richardson P.C.

(57) ABSTRACT

A fuel dispensing unit for refueling vehicles, comprising a fuel line having a fuel inlet, a gas exit and a fuel exit. A sensor is arranged to measure the amount of gas in the fuel flowing through the fuel line.

21 Claims, 1 Drawing Sheet

FUEL DISPENSING UNIT WITH GAS SENSOR

REFERENCE TO RELATED APPLICATION

The present application claims the benefit of priority under 35 U.S.C. §119 to European Patent Application No. 05106269.3 filed on Jul. 8, 2005.

TECHNICAL FIELD

The present invention relates to a fuel dispensing unit for refueling vehicles, comprising a fuel inlet and connected thereto a fuel line having a gas exit and a fuel exit. The invention also relates to techniques for avoiding distribution of gas contaminated fuel.

BACKGROUND

There are several existing techniques to separate gas, such as vapor, air and/or any other gas, from fuel dispensed from a fuel dispensing unit, such as a petrol pump, to a vehicle. This separation is important since a person purchasing the fuel shall pay only for the fuel dispensed and not for any gas entrained therein. Hence it is vital to measure accurately the volume of dispensed liquid, but if the fuel is contaminated with gas, a fuel flow meter, which cannot differentiate between the liquid and the gas, will produce an erroneous reading for the volume of fuel dispensed.

To avoid erroneous readings gas is separated from fuel by means of gas separation. If too much gas is separated, the dispensing unit is stopped and fuel is prevented from being dispensed. After a stop it is common that some kind of reset maneuver must be performed before fuel may be dispensed again.

Entrained gas often forms in the fuel when it is pumped or transported along the fuel line from the main tank to the nozzle of the fuel dispensing unit. Some of the reasons for gas formation may be wake caused by moving parts such as pumps, vortexes and regions of low pressure along the fluid pathway, any unattended leakage etc. Authorities in many countries stipulate rules of accuracy for gas separation devices and issue approvals before such a device can be used in a fuel dispensing unit. Hence efficient testing and verification of a gas separator must be possible.

Another aspect is gas contamination in the form of bubbles having different volumes along the fuel line due to different pressure zones in the fuel line.

A general problem with existing devices for gas separation and means for detecting the presence of gas is that they are relatively complicated and expensive both in respect of construction and production. Another problem is that gas is not separated efficiently enough from the fuel, and yet another that the separated gas is not detected so that dispensing of fuel can be stopped. This causes operational disturbance and increases the cost of operation. A customer also pays for gas entrained within the fuel.

EP 0 492 400 discloses a gas separator for liquid fuels comprising a feed pump, an outlet valve, a smoothing chamber and a gas separator nozzle which opens to a diffuser. A bell shaped displacement body is arranged above the diffuser and dips a constant distance into the fuel in a float chamber. When gas free liquid is fed through the diffuser, a pilot valve is open allowing the outlet valve to be open and thus fuel to be fed to a vehicle. When gas contaminated fuel is fed, the bell shaped body entrains the gas, rises and closes the pilot valve which in turn results in closure of the outlet valve.

A problem associated with the technique above is that the entrained gas must exceed a certain amount in the bell before the bell rises, resulting in a slow response time and an increased risk of feeding gas contaminated fuel to a vehicle.

U.S. Pat. No. 5,501,246 describes a device for separating gas entrained in a flow of liquid fuel. The device has a main housing with a liquid inlet, a liquid outlet and a separation chamber within the housing and between the inlet and the outlet. Gas entrained in the liquid is separated when the liquid passes within the separation chamber and the gas exits the chamber via a vent passage. Gas detection means are arranged to detect gas in the vent passage which means is connected to a pilot valve which closes when gas is detected. Closure of the pilot valve results in closure of a main valve that must be open when fuel is to be dispensed.

One problem of the device above is that it is based on hydraulic principles. This gives a slow response time and may cause gas contaminated fuel to be dispensed. Another problem is the need for two valves which both have membranes. This results in increased costs, in particular in respect of production of the device.

In summary, prior art has the problem of high costs in the form of operational down-time, necessary maintenance and service work. The units are based on mechanical and hydraulic principles which involve a high material and assembly cost. Furthermore, the response time is long from the moment when gas is detected until the dispensing of fuel is stopped. Another problem is that the techniques do not allow, for example, the pump to be stopped, but merely a valve to be closed. Yet another problem is that the techniques only have an "on-off" position, meaning that it is not possible to detect small amounts of gas that does not necessary result in closure of the main valves; the main valve is either open or closed.

SUMMARY

It is an object of the present invention to provide an improvement of the above techniques and prior art.

A particular object is to provide a fuel dispensing unit with improved gas detection capabilities that is simple in construction, offers low production costs, high operational time and low maintenance.

Another object of the present invention is to provide a fuel dispensing unit with a quicker response time from the moment when gas contaminated fuel passes the fuel line until dispensing of fuel is prevented.

Still another object of the present invention is to provide a fuel dispensing unit that accurately detects and/or measures the amount of gas entrained in the fuel flowing through a fuel line within the fuel dispensing unit.

Still another object of the present invention is to provide a fuel dispensing unit that detects gas contaminated fuel even if a maximum level of allowed contamination is not reached.

A further object of the present invention is to provide a fuel dispensing unit that can quickly be reset after dispensing of fuel has been stopped due to high levels of gas contamination.

These and other objects and advantages that will be apparent from the following description of the present invention are achieved by a fuel dispensing unit having the features stated in claim 1. Preferred embodiments are defined in the dependent claims.

Hence a fuel dispensing unit for refueling vehicle, comprising a fuel line having a fuel inlet, a gas exit and a fuel exit is described. A sensor is arranged to measure the amount of gas in the fuel flowing through the fuel line.

A general advantage of the invention is that it is possible to produce a fuel dispensing unit, such as a petrol pump for service at petrol stations, of a simpler construction and at a lower production cost. In addition, the unit has a higher operational time and a lesser need for maintenance and service.

Another advantage is that gas contamination within the fuel can be monitored continuously, hence there is no threshold value that must be exceeded before dispensing of fuel is prevented. This also allows preventive service before a maximum contamination value is reached. Furthermore, the invention has the advantage of being capable of measuring the amount of gas contamination and allowing a very quick response time when contamination is detected.

This advantage is further supported by continuous monitoring.

Still another advantage is that it is easy to reset a sensor arranged to measure the amount of gas entrained within fuel flowing through the fuel line, after the sensor has indicated gas contamination and dispensing of fuel has been prevented.

The fuel dispensing unit may be fitted with a control unit connected to the sensor. At a predetermined measure level from the sensor the control unit will prevent fuel from being dispensed from the fuel dispensing nozzle. Preferably the sensor transmits an electrical signal to the control unit. In order to prevent fuel from being dispensed, the control unit may, for example, be arranged to stop a fuel pump in the fuel dispensing unit or to close a valve in the fuel line.

The fuel dispensing unit, which also comprises a fuel line having a gas separation chamber with a chamber gas outlet and a gas separator with a fluid outlet to the gas separation chamber, may according to a first variant of the invention also have the sensor arranged to measure the amount of gas flowing through the chamber gas outlet. According to a second variant a sensor may be arranged to measure a stream of fuel from the fluid outlet of the gas separator.

According to the first variant the sensor is arranged at the chamber gas outlet and may be any kind of known meter for measuring the flow of gas, such as a float meter, impeller meter (winged wheel meter), vortex meter, Doppler meter, pressure differential meter, rotameter, Woltman meter or a thermal flowmeter (heating meter).

According to the second variant the sensor may also be arranged to measure the force exerted by the stream of fuel. Furthermore the sensor is arranged at the fluid outlet of the gas separator and may, for example, be a pin directed at the fluid outlet of the gas separator.

The fuel dispensing unit having a fuel line comprising a fuel pump with a suction side and a feeding side feeding fuel to a gas separator, may according to a third variant have the sensor arranged to measure gas in fluid flowing on the feeding side or on the suction side of the pump. The gas may be measured by, for example, arranging the sensor to measure the density of fluid flowing on the suction or feeding side of the pump, and the senor could be, for example, an ultrasound meter, radar meter or an optical meter.

The fuel dispensing unit having a fuel line comprising a fuel meter arranged to measure fuel dispensed at the fuel exit, may according to a fourth variant have the sensor arranged to measure the amount of fuel flowing in the fuel line upstream the fuel meter. The fuel line also comprising a fuel pump feeding fuel to a gas separator arranged upstream the fuel meter may have the sensor arranged to measure the amount of fuel flowing in the fuel line upstream the pump or upstream the gas separator but downstream the pump. Upstream and downstream are in this context positions related to the direction of the fuel flow under normal operation of the fuel dispensing unit! i.e. the fuel flows from a device arranged upstream the fuel line, to a device arranged downstream the fuel line. The fuel dispensing unit may, using its control unit, calculate a difference in the amount of fuel measured by the sensor and the fuel meter respectively, and the sensor could be i.e. a float meter, impeller meter (winged wheel meter), vortex meter! Doppler meter, pressure differential meter, rotameter, Woltman meter or a thermal flowmeter (heating meter).

The details of one or more embodiments of the invention are set forth in the accompanying drawings and the description below. Other features, objects, and advantages of the invention will be apparent from the description and drawings, and from the claims.

DESCRIPTION OF DRAWINGS

Embodiments of the present invention will now be described, by way of example, with reference to the accompanying schematic drawing in which.

Like reference symbols in the various drawings indicate like elements.

DETAILED DESCRIPTION

Figure 1:
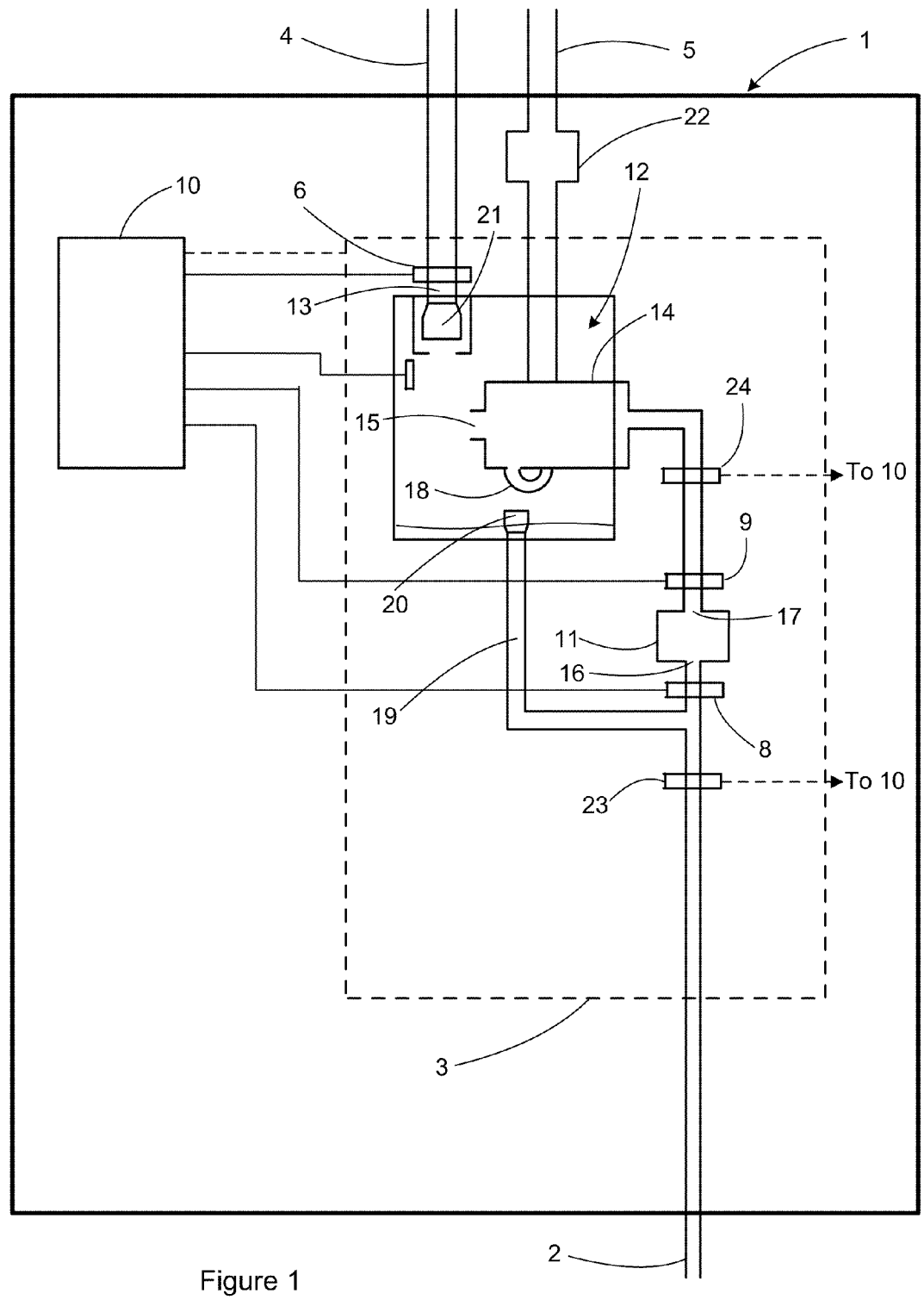
FIG. 1 is a schematic drawing of the fuel dispensing unit.

FIG. 1 shows a fuel dispensing unit 1 having a fuel line 3 with at least one gas exit 4, at least one fuel exit 5 and a fuel inlet 2 coming from a tank of fuel which is not illustrated. One or more sensors 6-9, 23, 24 are arranged along the fuel line 3 between the fuel inlet 2 and the gas exit 4 and/or the fuel exit 5. The sensor(s) 6-9, 23, 24 measure(s) the rate of gas flow flowing through the fuel line 3, or in other words, the rate of gas contamination in the fuel flowing through the fuel line 3. A control unit 10 is connected to the sensor(s) 6-9, 23, 24 and prevents fuel from being dispensed from the fuel exit when a predetermined measure level from the sensor(s) 6-9, 23, 24 is exceeded. Prevention of fuel to be dispensed is done by sending a signal from the control unit 10 to a pump 11 causing it to stop pumping fuel along the fuel line 3, or to a valve in the fuel line 3 causing the valve to stop the flow of fuel. The valve is not shown and can be arranged anywhere in the fuel line where, when it is closed, it can stop the flow of fuel. The control unit 10 may be a programmable electrical unit with electrical input/output connections. The unit 10 operates by receiving a signal from the sensor(s) 6-9, 23, 24, which signal either directly indicates an amount of gas or which signal directly or indirectly corresponds to the amount of gas. When needed the control unit 10 converts the signal to a value 30 correctly indicating the amount of gas. The unit 10 then monitors that the amount of gas does not exceed a preprogrammed value in relation to the amount of fuel flowing through the fuel line 3. The amounts of fuel and gas flowing can be measured in for example l/min or kg/min.

If gas contamination is present in the fuel, but the amount is not high enough to prevent fuel distribution, a message may be displayed on a display indicating the amount of contaminations. The display is preferably arranged on the control unit 10 which also, at least temporarily, stores the momentary values of the amount of gas flowing.

It should be noted that the fuel line 3, even if so not illustrated in the drawing, may comprise, for example, one or more pumps, filters, valves, external connections/float bodies etc.

Preferably a pump 11 is connected with its suction side 16 to the fuel inlet 2 and with its feeding side 17 to a gas separator 14. The gas separator 14 is preferably a centrifugal separator and has a fluid outlet 15 to a gas separation chamber 12 and a fuel outlet 18 connected to the fuel exit 5. The gas separation chamber 12 has a chamber gas exit 13 that is connected to the gas exit 4. The gas separation chamber 12 has a lower float body 20, an upper float body 21 and a fuel return line 19 connected to the suction side 16 of the pump 11 but after the fuel inlet 2.

According to a first variant the sensor 6 is arranged at the chamber gas outlet 13, which also could be interpreted as, and is functionally identical to, an arrangement at the gas exit 4. The sensor 6 measures the amount of gas flowing through the chamber gas outlet and can be any known type of gas meter such as a float meter, impeller meter (winged wheel meter), vortex meter, Doppler meter, pressure differential meter, rotameter, Woltman meter or a thermal flowmeter (heating meter).

According to a second variant the sensor 7 is arranged opposite to the fluid outlet 15 of the gas separator. The sensor measures a stream of liquid from the fluid outlet of the gas separator 14. In a preferred embodiment the force exerted by the stream of liquid is measured, and the sensor 7 is a pin directed at the fluid outlet of the gas separator.

According to a third variant the sensor 8 is arranged on the suction side 16 of the pump 11, and/or the sensor is arranged on the feeding side 17 of the pump 11. The sensor 8 and/or 9 measure gas in fluid flowing on the suction side 16 or on the feeding side 17 of the pump 11. In a preferred embodiment the gas is measured and calculated by measuring the density of the flowing fluid, and the sensor is an ultrasound meter, radar meter or an optical meter.

According to a fourth variant the fuel line 3 has a fuel meter 22 arranged downstream the gas separator 14 to measure fuel dispensed at the fuel exit 5. The sensor 23 is arranged upstream the pump 11 and/or the sensor 24 is arranged upstream the gas separator 14 but downstream the pump 11. The sensors 23 and/or 24 measure the amount of fuel flowing in the fuel line 3 where the sensors 23 and 24 are arranged. In a preferred embodiment the gas is measured and calculated by the control unit 10, by calculating a difference in the amount of fuel measured by the sensors 23 and 24 and the fuel meter 22, respectively. The sensor may be a float meter, impeller meter (winged wheel meter), vortex meter, Doppler meter, pressure differential meter, rotameter, Woltman meter or a thermal flowmeter (heating meter).

It is, of course, possible to combine the four variants above in any desired combination.

OPERATION

During normal operation of the fuel dispensing unit the fuel inlet 2 is connected to a tank of fuel, from which tank the pump 11 pumps fuel. The fuel exits the pump 11 and enters the gas separator 14 which separates any gas contamination from the fuel. The separated or decontaminated fuel exits the gas separator 14 via the gas separator outlet 18 which ends in a fuel exit 5 usually in the form of a nozzle. As long as no gas contamination is present in the fuel, fuel streams out of the fluid outlet 15 in the form of a jet that hits the inner wall of the gas separation chamber. After this the fuel that hits the wall flows down to the bottom of the gas separation chamber 12 and when the fuel reaches a certain level, a lower float body 20 rises and opens a fuel return line 19. When the fuel return line 19 is open, the pump 11 also pumps the fuel from the bottom of the gas separation chamber 12 until the fuel level in the chamber has become sufficiently low for the lower float body to close the fuel return line 19. The opening and closing of the fuel return line 19 is, under operation of the fuel dispensing unit, a continuous process. If the lower float body 20 for some reason does not open the fuel return line 19, fuel is prevented from exiting via the gas exit 4 by means of an upper float body 21.

When gas contaminated fuel is present along the fuel line 3, the density of the fuel is lower both on the suction 16 and the feeding side 17 of the pump 11, a combination of foam, fuel, gas and air exits the fluid outlet 15 of the gas separator 14, gas enters the gas separation chamber 12 and finally exits via the chamber gas outlet 13 and gas exit 4.

When gas contaminated fuel is present along the fuel line 3, in the first variant, the sensor 6 in combination with the control unit 10 detect and measure an undesired amount of flow of gas exiting the gas separation chamber 12.

When gas contaminated fuel is present along the fuel line 3, in the second variant, the sensor 7 in combination with the control unit 10 detect and measure an undesirable low level of force acting on the sensor 7, indicating the presence of gas in the fuel. The sensor 7 may also measure an amount of liquid streaming out from the fluid outlet 15, thus being capable of differentiating gas and liquid. In the case where the sensor 7 is a pin directed at the fluid outlet 15 of the gas separator 14, the pin is spring-biased and retracts by the force exerted by liquid exiting the fluid outlet 15 when fuel is dispensed. When fuel is dispensed and no or a low level of retraction is present, this indicates presence of gas, since gas can not exert the same force as liquid.

When gas contaminated fuel is present along the fuel line 3, in the third variant, the sensors 8 and/or 9 in combination with the control unit 10 detect and measure an undesired change of density. It is also possible to measure directly the volume of gas present in the fuel.

When gas contaminated fuel is present along the fuel line 3, in the fourth variant, the sensors 23 and/or 24 and the flow meter 22 measures the flow of fuel receptively. Between the sensors 23 and/or 24 and the flow meter 22 gas is separated by the gas separator 14, giving fuel at the flow meter 22 a smaller volume. By calculating, by means of the control unit 10, a difference in flow of fuel at the sensors 23 and/or 24 and the flow meter 22, respectively, the amount of gas in the fuel flowing through the fuel line 3 is calculated. Since fuel at the feeding side 17 of the pump 11 is under higher pressure and thus denser than fuel on the suction side 16, it is also possible to measure the volume of fuel at the sensor 23 and compare it with the volume measured at the sensor 24. The difference between the sensors can be calculated by the control unit 10 giving a difference in volume. This volume difference directly corresponds to the amount of gas in the fuel, since basically only gas is compressed on the feeding side 17 of the pump 11 as compared with the suction side 16. The principle of the fourth variant is mainly based on measuring the volume of fuel flowing, which volume corresponds to the amount of fuel flowing. It should be noted that, when calculating the amount of gas in the fuel, consideration must be taken of the amount of fuel flowing through the fuel return line 19. Preferably the sensor 23 is arranged upstream the fuel return line's 19 connection to the fuel inlet 2.

In all cases, when gas contaminated fuel is present and at a predetermined threshold value, the control unit 10 sends a signal to a valve closing the fuel line 3 or a signal to a pump stopping pumping of fuel, thus making fuel distribution to a vehicle impossible.

Apart from the rate of gas flowing, it is also possible to calculate and measure the amount of gas flowing through the fuel line during a specific period of time.

It is also possible to arrange one or more of sensors 6-9, 23 and 24 to continuously measure the amount of gas in the fuel flowing through the fuel line. Preferably, the sensor(s) 6-9, 23 and 24 and the control unit 10 continuously measure the gas flow, but can also perform momentary measurements.

In the third variant the density of the fuel is preferably measured on the suction side, since this side has the lowest pressure making it possible to detect gas more easily.

It is possible to arrange the control unit 10 as a part of the fuel meter 22 or by integrating the control unit 10 with the fuel meter's 22 control unit. By doing this, since the fuel meter already is electrically insulated from fuel handling means, it is possible to achieve a cost efficient design.

A number of embodiments of the invention have been described. Nevertheless, it will be understood that various modifications may be made without departing from the spirit and scope of the invention.

What is claimed is:

1. A fuel dispensing unit for refueling vehicles, comprising:
    a fuel line having a fuel inlet;
    a fuel pump feeding fuel to a gas separator;
    a return fuel line in fluid communication with the fuel inlet and the gas separator, the return fuel line adapted to transfer a portion of fuel from the gas separator to the fuel inlet;
    a gas exit; and
    a fuel meter arranged downstream the gas separator to measure an amount of fuel dispensed at a fuel exit, wherein a sensor is adapted to indirectly measure an amount of gas in fuel flowing through the fuel line, by being arranged upstream the gas separator, and by measuring the amount of fuel flowing in the fuel line where the sensor is arranged, the amount of gas being measured and calculated by a control unit, by calculating a difference between the amount of fuel measured by the sensor and the amount of fuel measured by the fuel meter,
    wherein the sensor is arranged upstream of a coupling point between the return fuel line and the fuel inlet.

2. A fuel dispensing unit according to claim 1, wherein the control unit is connected to the sensor and, at a predetermined measure level from the sensor, is arranged to prevent fuel from being dispensed from the fuel exit.

3. A fuel dispensing unit according to claim 1, wherein the sensor is arranged to transmit an electrical signal to the control unit.

4. A fuel dispensing unit according to claim 1, wherein the control unit is arranged to stop a pump in the fuel line.

5. A fuel dispensing unit according to claim 1, wherein the control unit is arranged to close a valve in the fuel line.

6. A fuel dispensing unit according to claim 1, wherein the sensor is selected from the group consisting of a float meter, impeller meter, winged wheel meter, vortex meter, Doppler meter, pressure differential meter, rotameter, Woltman meter, a thermal flowmeter, and a heating meter.

7. A fuel dispensing unit according to claim 1, wherein the gas separator is a centrifugal separator.

8. A fuel dispensing unit according to claim 1, wherein the control unit is a part of the fuel meter arranged to measure fuel dispensed at the fuel exit.

9. A fuel dispensing unit for refueling vehicles, comprising:
    a fuel line having a fuel inlet;
    a fuel pump feeding a fuel comprising liquid fuel and gas to a gas separator;
    a gas exit;
    a fuel meter arranged downstream the gas separator to measure an amount of fuel dispensed at a fuel exit, the fuel dispensed at the fuel exit being substantially liquid fuel; and
    a return fuel line in fluid communication with the fuel inlet and the gas separator, the return fuel line adapted to transfer a portion of the liquid fuel from the gas separator to the fuel inlet,
    wherein a sensor is adapted to indirectly measure the amount of gas in the fuel flowing through the fuel line, by being arranged upstream the gas separator, and by measuring the amount of the fuel flowing in the fuel line where the sensor is arranged, the amount of the gas being measured and calculated by a control unit, by calculating a difference between the amount of fuel measured by the sensor and the amount of fuel measured by the fuel meter, and
    wherein the sensor is arranged upstream of a coupling point between the return fuel line and the fuel inlet.

10. A fuel dispensing unit according to claim 9, wherein the control unit is arranged to stop a pump in the fuel line.

11. A fuel dispensing unit according to claim 9, wherein the control unit is arranged to close a valve in the fuel line.

12. A fuel dispensing unit according to claim 9, wherein the sensor is arranged to transmit an electrical signal to the control unit.

13. A fuel dispensing unit according to claim 9, further comprising a second sensor arranged upstream of the fuel pump within the fuel line.

14. A fuel dispensing unit according to claim 9, wherein the gas separator is a centrifugal separator.

15. A fuel dispensing unit for refueling vehicles, comprising:
    a fuel line having a fuel inlet;
    a gas-liquid separator in fluid communication with the fuel line and comprising a gas exit line and a fuel outlet;
    a fuel pump feeding a fuel comprising liquid fuel and gas to the gas separator;
    a return fuel line fluidly coupled to the gas separator and the fuel inlet; and
    a fuel meter arranged downstream the gas separator to measure an amount of the liquid fuel dispensed at the fuel outlet;
    a flow sensor arranged in the fuel inlet upstream of the gas separator, the fuel pump and the return fuel line, and upstream of a coupling point between the return fuel line and the fuel inlet, the flow sensor adapted to measure a flow rate of fuel comprising the liquid fuel and gas flowing through the fuel inlet; and
    a controller communicably coupled to the fuel meter and the flow sensor, the controller adapted to receive a first signal indicative of the measured liquid fuel from the fuel meter and a second signal indicative of the measured fuel flowing through the fuel inlet and compare the first and second signals to determine a difference between the amount of fuel measured by the sensor and the amount of liquid fuel measured by the fuel meter, the difference comprising an amount of the gas in the fuel.

16. A fuel dispensing unit according to claim 15, wherein the controller is adapted to prevent fuel from being dispensed from the fuel exit at a predetermined measure level from the flow sensor.

17. A fuel dispensing unit according to claim 15, wherein the flow sensor is arranged to transmit an electrical signal to the controller.

18. A fuel dispensing unit according to claim 15, wherein the controller is arranged to stop the fuel pump in the fuel line.

19. A fuel dispensing unit according to claim 15, wherein the controller is arranged to close a valve in the fuel line.

20. A fuel dispensing unit according to claim 15, wherein the flow sensor is selected from the group consisting of a float meter, impeller meter, winged wheel meter, vortex meter, Doppler meter, pressure differential meter, rotameter, Woltman meter, a thermal flowmeter, and a heating meter.

21. A fuel dispensing unit according to claim 15, wherein the gas separator is a centrifugal separator.

* * * * *